(12) United States Patent
Kangas et al.

(10) Patent No.: US 11,146,617 B1
(45) Date of Patent: Oct. 12, 2021

(54) APPLICATION DETECTION

(71) Applicant: Cujo LLC, El Segundo, CA (US)

(72) Inventors: Santeri Kangas, Kirkkonummi (FI); Toni Ala-Piirto, Vantaa (FI)

(73) Assignee: Cujo LLC, Walnut, CA (US)

( * ) Notice: Subject to any disclaimer, the term of this patent is extended or adjusted under 35 U.S.C. 154(b) by 0 days.

(21) Appl. No.: 17/063,161

(22) Filed: Oct. 5, 2020

(51) Int. Cl.
*G06F 15/173* (2006.01)
*H04L 29/08* (2006.01)
*H04L 12/26* (2006.01)

(52) U.S. Cl.
CPC .......... *H04L 67/025* (2013.01); *H04L 43/04* (2013.01); *H04L 43/062* (2013.01); *H04L 67/2804* (2013.01); *H04L 67/36* (2013.01)

(58) Field of Classification Search
CPC ..... H04L 67/025; H04L 43/04; H04L 43/062; H04L 67/2804; H04L 67/36
USPC ................................................. 709/223–225
See application file for complete search history.

(56) References Cited

U.S. PATENT DOCUMENTS

| | | | | |
|---|---|---|---|---|
| 10,789,542 | B2* | 9/2020 | Travostino | G06N 20/10 |
| 2016/0204992 | A1* | 7/2016 | Wu | H04L 43/10 |
| | | | | 709/224 |
| 2017/0118240 | A1* | 4/2017 | Devi Reddy | H04L 63/1433 |
| 2017/0169358 | A1* | 6/2017 | Choi | G06F 16/9535 |
| 2017/0251013 | A1* | 8/2017 | Kirti | H04L 63/1441 |
| 2018/0278496 | A1* | 9/2018 | Kulshreshtha | H04L 41/145 |
| 2020/0044962 | A1* | 2/2020 | Sanzgiri | H04L 63/145 |

* cited by examiner

*Primary Examiner* — Duyen M Doan
(74) *Attorney, Agent, or Firm* — Withrow & Terranova, PLLC

(57) ABSTRACT

An application detection method includes receiving, from one or more user devices on a plurality of local networks, first network traffic metadata being related to a client application running on the one or more user devices, receiving, from a plurality of network traffic hubs of the plurality of local networks, second network traffic metadata corresponding to the first network traffic metadata but excluding user device specific data, generating a plurality of combined network traffic metadata datasets for each received first network traffic metadata and the corresponding second network traffic metadata by matching metadata attributes of the first and second network traffic metadata, generating an application detection model by using the plurality of combined network traffic metadata datasets, and using the application detection model for detecting further client applications running on one or more user devices on one or more local networks.

20 Claims, 4 Drawing Sheets

APPLICATION DETECTION

TECHNICAL FIELD

The present application relates generally to network security.

BACKGROUND

It can be desirable to have reliable application detection for enabling different security protection features, such as blocking specific applications, enforcing time limits to applications or application categories.

SUMMARY

According to an aspect of the invention there is provided a method as specified in claim 1.

According to other aspect of the invention, there is provided an apparatus in a computer network system as specified in claim 14.

According to other aspect of the invention, there is provided a non-transitory computer-readable medium comprising stored program code, the program code comprised of computer-executable instructions that, when executed by a processor, causes the processor to operate as specified in claim 20.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for the purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message", and does not imply a priority, a type, an importance, or other attribute, unless otherwise stated herein.

As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Reliable application detection is needed for enabling different security protection features, such as blocking specific applications, enforcing time limits to applications or application categories.

There are several methods of creating detections for applications running on network connected devices that are based on the network traffic seen by a router or other network device, such as a firewall. Commonly these detections are created in a very controlled environment with well-known datasets and traffic patterns. However, collecting application specific network traffic patterns is a labor-intensive process that includes profiling applications and recording their network activities. This process is both expensive and difficult to scale. The process is further complicated by frequent application updates changing the networking behavior of the applications and thus, forcing updates on the detection process.

There is a need for automated techniques for detecting and identifying applications in computer networks.

Figure 1:
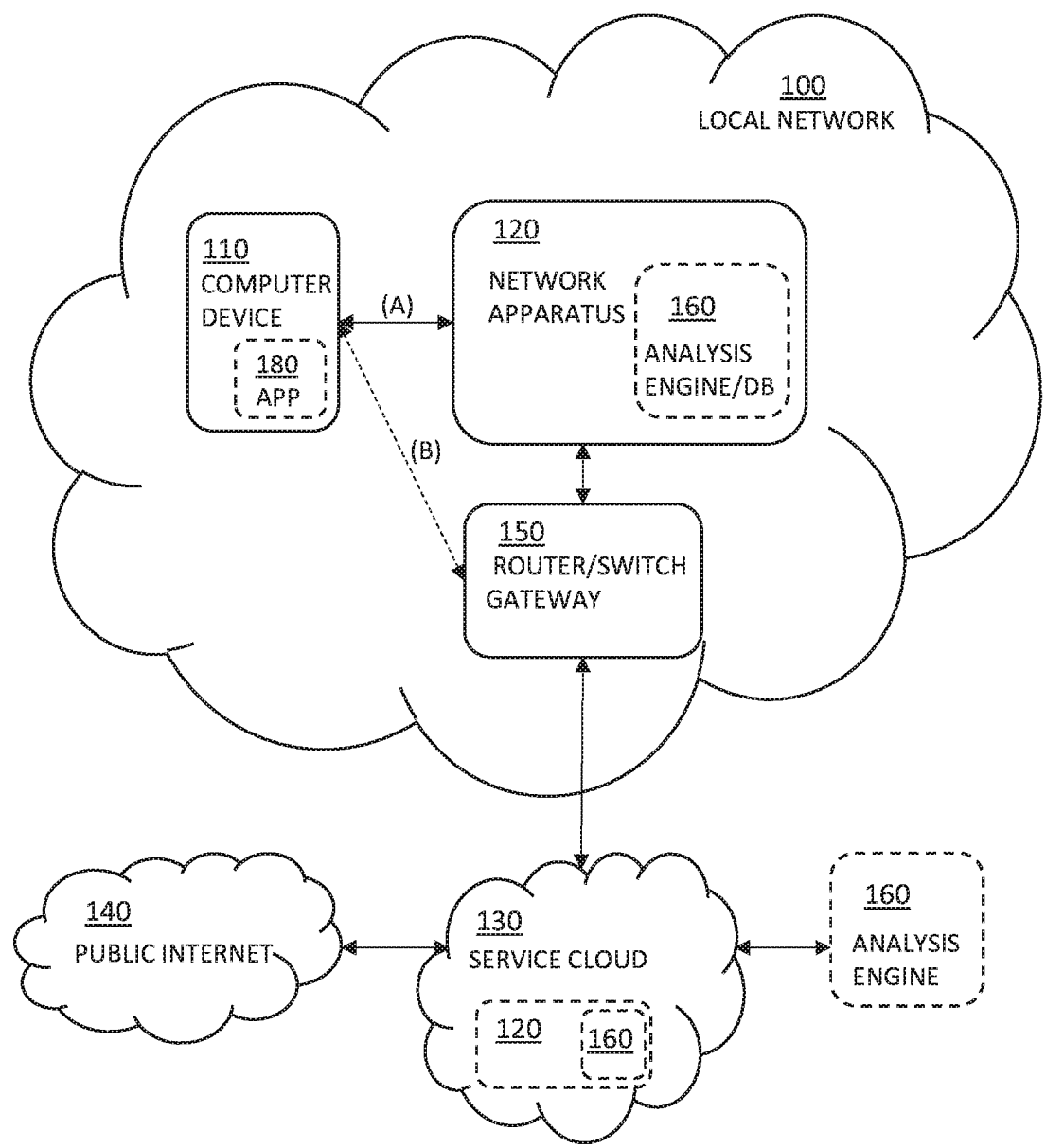
FIG. 1 illustrates an example system environment for a network apparatus in a computer network system.

FIG. 1 illustrates schematically an example of a system environment for a network apparatus 120. The system environment illustrated in FIG. 1 includes a computer network 100, such as a local network, that may include one or more computer devices 110, the network apparatus 120, a local router/switch 150, and an analysis engine and a database 160. The computer devices 110 may also comprise any number of client applications 180. The example system also includes a service cloud 130, such as a network operator's cloud and the Internet 140. The analysis engine/database 160 may reside in the computer network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the computer network 100. In another embodiment, the device 110 may communicate (B) directly via a network gateway or a modem 150, for example when the device is not in the computer network 100. In an embodiment, the network operators may deploy a service platform on their broadband gateways 150 provided to customers and in their own cloud environments 130. The user device(s) 110 may also be configured to use the services provided by the service cloud 130 by one or more applications/operating systems 180 installed on the device(s) 110.

The device 110 may be any computer device, such a smart device, a smart appliance, a smart phone, a laptop, or a tablet having a network interface and an ability to connect to the network apparatus 120 and/or the local network router 150 with it. The network apparatus 120 collects information e.g. about the computer network 100, including data about the network traffic through the computer network 100 and data identifying devices in the computer network 100, such as any smart appliances and user devices 110. The network apparatus 120 is configured to receive traffic control instructions from the analysis engine 160 and to process network traffic based on the traffic control instructions. Processing the network traffic through the computer network 100, for example, can include enforcing network or communication policies on devices, restricting where network traffic can travel, blocking network traffic from entering the computer network 100, redirecting a copy of network traffic packet or features of those packets to the analysis engine 160 for analysis (e.g., for malicious behavior), or quarantining the network traffic to be reviewed by a user (e.g., via the user device 110) or network administrator. In some embodiments, the functionality of the network apparatus 120 is performed by a device that is a part of the computer network 100, while in other embodiments, the functionality of the network apparatus 120 is performed by a device outside of the computer network 100.

The network apparatus 120 may be configured to monitor traffic that travels through the computer network 100. In some embodiments, the network apparatus 120 can be a device that is a part of the computer network 100. The network apparatus 120 can be connected to the computer network 100 using a wired connection (e.g. via an Ethernet cable connected to a router) or using a wireless connection (e.g. via a Wi-Fi connection). In some embodiments, the network apparatus 120 can comprise multiple devices. In some embodiments, the network apparatus 120 can also perform the functions of the local network router 150 for the computer network 100.

In some embodiments, the network apparatus 120 may intercept traffic in the computer network 100 by signaling to the user device 110 that the network apparatus 120 is a router 150. In some embodiments, the network apparatus 120 replaces the default gateway or gateway address of the computer network 100 with its own Internet protocol address. In some embodiments, the computer network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the computer network 100.

The analysis engine 160 may receive and analyze network traffic data (e.g., forwarded by the network apparatus 120) associated with devices on the computer network. The analysis engine 160 may be implemented within a remote system (e.g., a cloud server) or within the computer network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the computer network router 150 may be configured to forward network traffic to the analysis engine 160. In some embodiments, the analysis engine 160 communicates with other devices on the computer network. In some embodiments, the analysis engine 160 is integrated into the network apparatus 120.

The computer network 100 may be a local area network (LAN) that comprises the one or more devices 110, network apparatus 120, and local network router 150. The computer network 100 may be used for a number of purposes, including a home network or a network used by a business. The computer network 100 is connected to the Internet or other Inter-autonomous network infrastructure 140, allowing devices within the computer network 100, including the user device 110, to communicate with devices outside of the computer network 100. The computer network 100 may be a private network that may require devices to present credentials to join the network, or it may be a public network allowing any device to join. In some embodiments, other devices, like personal computers, smartphones, or tablets, may join computer network 100.

The internet 140 and the computer network 100 may comprise any combination of LANs and wide area networks (WANs), using both wired and wireless communication systems. In some embodiments, the internet 140 and the computer network 100 use standard communications technologies and protocols. Data exchanged over the internet 140 and the computer network 100 may be represented using any suitable format, such as hypertext markup language (HTML) or extensible markup language (XML) or any other presentation or application layer format suitable for transporting data over a network. In some embodiments, all or some of the communication links of the internet 140 and the computer network 100 may be encrypted using any suitable technique or techniques.

The computer device 110 may be a computing device capable of receiving user input as well as transmitting and/or receiving data via the Internet 140 or computer network 100. In some embodiments, the device 110 is a conventional computer system, such as a desktop or a laptop computer. Alternatively, the device 110 may be a device having computer functionality, such as a personal digital assistant (PDA), a mobile telephone, a smartphone, or another suitable device. The device 110 is a network device configured to communicate with the Internet 140 or computer network 100. In some embodiments, the device 110 executes an application (e.g., application 180) allowing a user of the user device 110 to interact with other network devices, such as the smart appliances, the network apparatus 120, the router 150, or the analysis engine 160. For example, the device 110 executes a browser application to enable interaction between the device 110 and the network apparatus 120 via the computer network 100.

The client application 180 is a computer program or software application configured to run on the user device 110. For example, the application 180 is a web browser, a mobile game, an email client, or a mapping program. The device 110 can have any number of applications 180 installed. The application 180 may communicate, via the user device 110, with devices inside and outside of the computer network 100.

The computer network 100 can also be a small office and/or a domestic network that comprises several Internet of Things (IoT) and smart devices as well as portable computers and tablet computers, for example. At least part of these devices are connected to the Internet 140, for example, via one or more Wi-Fi access points.

Since network traffic data used for creating application detection rules or machine learning models are required to be well known, they have been typically obtained from controlled environment and conditions in order to label specific traffic data relating to specific applications. Creating such automation environment or performing manual labeling is labor intensive and seriously limits the amount of quality data that can be obtained.

Embodiments of the present invention overcome the drawbacks of the previous solutions by applying new capabilities and methods targeted to enable identification of applications based on an application detection model generated based on network traffic data that has been collected both from a plurality of local network routers and from user devices running designated software applications connected to the same routers. Embodiments of the present invention enable building of the application detection model being fully automated by collecting network traffic data from these different data sources. Processing and combining information from these two data sources allow automatic labeling of network traffic data and collection of the data from customer deployments instead of from a controlled laboratory environment, thus removing the need for manual processes of collecting this data. Embodiments of the invention enables data being gathered from customer devices running the dedicated applications for this purpose and from their network, thus enabling the same collection method for both free and paid applications and removing the need for purchasing different applications for research purposes.

Figure 2:
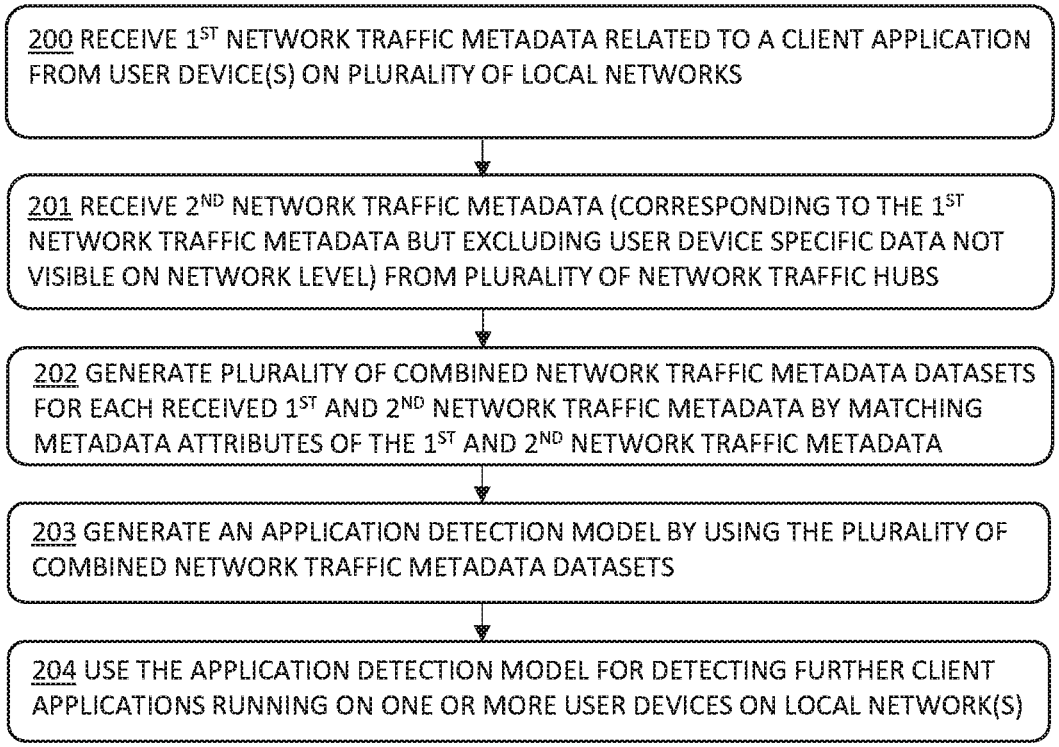
FIG. 2 illustrates an example method, according to one embodiment.

FIG. 2 is a flow diagram illustrating an embodiment of a method.

In 200, first network traffic metadata collected by one or more user devices and being related to one or more client applications running on the one or more user devices is received from the one or more user devices on a plurality of local networks. The first network traffic metadata comprises at least an application name of the one or more client applications, a target Internet Protocol (IP) address requested by the one or more client applications, and a timestamp of a connection request initiated by the one or more client applications.

In 201, second network traffic metadata corresponding to the first network traffic metadata but excluding user device specific data related to the one or more user devices that is not visible on a network level is received from a plurality of network traffic hubs of the plurality of local networks.

In 202, a plurality of combined network traffic metadata datasets is generated for each received first network traffic metadata and the corresponding second network traffic metadata by matching metadata attributes of the first network traffic metadata and the second network traffic metadata.

In 203, an application detection model is generated by using the plurality of combined network traffic metadata datasets.

In 204, the application detection model is used for detecting further client applications running on one or more user devices on one or more local networks.

In an embodiment, first network traffic metadata is collected by the one or more user devices and the second network traffic metadata is collected by the plurality of network traffic hubs (such as routers) of the plurality of local networks.

In an embodiment, one or more rules are created for instructing the one or more user devices and/or the plurality of network traffic hubs of when to collect the network traffic metadata, wherein the one or more rules are created based on at least one of: an identity of the local network, running detection only on limited number of user devices, enabling detection only for new client applications, enabling detection only for updated client applications.

In an embodiment, a specific client application detection software is deployed in the one or more user devices for collecting the first network traffic metadata.

In an embodiment, the plurality of combined network traffic metadata datasets are labelled by using the first network traffic metadata.

In an embodiment, the plurality of combined network traffic metadata datasets are clustered based on one or more of: a type of the client application, a version of the client application, a geolocation of the one or more user devices on a plurality of local networks, a geolocation of the plurality of network traffic hubs of the plurality of local networks.

In an embodiment, outlier datasets are detected in the combined network traffic metadata datasets and removed from the combined network traffic metadata datasets.

In an embodiment, a required dataset size of the plurality of combined network traffic metadata datasets is determined based on one or more threshold values of: number of network traffic hubs required to receive a similar dataset, percentage of datasets required to be similar, and the application detection model accuracy is dynamically adjusted/fine-tuned based on the required dataset size of the plurality of combined network traffic metadata datasets.

In an embodiment, an application detection model accuracy score is assigned based on the required dataset size, wherein the application detection model accuracy score is determined by using one or more of: decision rules, statistical analysis and artificial intelligence techniques.

In an embodiment, in response to determining that the application detection model accuracy score is above a predetermined threshold, the application detection model is accepted. In response to determining that the application detection model accuracy score is below the predetermined threshold, the application detection model is modified by increasing the required dataset size.

In an embodiment, the first network traffic metadata further comprises one or more of: a client application identity, a version of the client application, a network traffic type, a connection target, a connection direction, number of transferred bytes to upstream and downstream, user device identification, a protocol type.

In an embodiment, the second network traffic metadata comprises data corresponding to the first network traffic metadata but excluding user device specific data related to the one or more user devices that is not visible on a network level. Examples of such user device specific data that may not be visible on the network level and is thus not included in the second network traffic metadata comprises one or more of: a client application identity, a version of the client application, a user device identification (e.g. device manufacturer, device model, operating system version), and a protocol type.

In an embodiment, further data is received from the plurality of network traffic hubs, the further data comprising one or more of: a hardware version, a software version, an operating system version, an IP address of the network traffic hub of the plurality of network traffic hubs. In an embodiment, these connection attributes related to the plurality of network traffic hubs may be used in the creation of the application detection model.

In an embodiment, further action is taken to protect one or more local network and/or the one or more user devices based on the detected client application, the further action comprising one or more of: blocking the client application, enforcing time limits to client application or application categories, preventing communication with the client application, applying other security measures.

Figure 3:
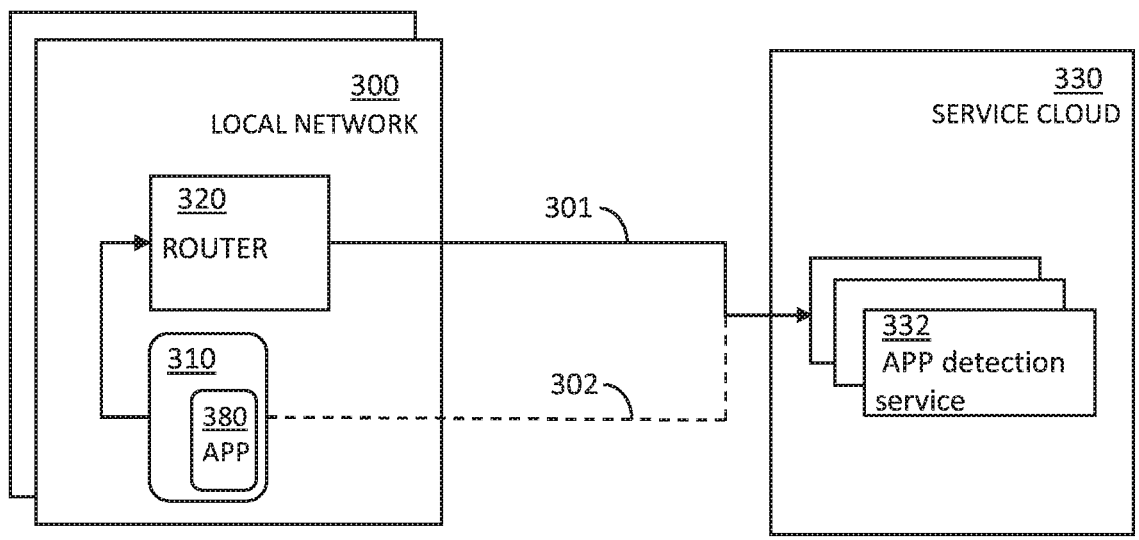
FIG. 3 illustrates another example system environment, according to one embodiment.

Turning now to FIG. 3 that is illustrating schematically another example of a system environment.

The system environment illustrated in FIG. 3 includes a plurality of computer networks 300, such as a local network, that each include one or more computer devices 310, and a local router 320. The computer devices 310 may comprise any number of client applications. The example system also includes a service cloud 330 comprising any number of application detection services/models 332.

One or more computer devices 310 of each computer network of the plurality of computer networks 300 also runs a dedicated software application 380 for collecting and recording application network traffic metadata relating to other applications and software running on the computer device 310 and using computer network. In an embodiment, the dedicated software application 380 is deployed only in a limited number of the one or more computer devices which is smaller than the total number of computer devices in a local network. The dedicated software application 380 may be a standalone or embedded to another application. In an embodiment, the decision on whether the dedicated software application 380 is configured to collect network traffic metadata or not, may be based on numerous factors and may be controlled by the service cloud, for example. These factors may be based on, for example, the identity of the computer network to which the computer device is connected, running detection only on limited number of computer devices, enabling detection only for new applications or updated versions of applications.

The collected application network traffic metadata by the software application 380 is sent to the application detection service 332 for processing. In an embodiment, each computer device 310 may transmit the collected application network traffic metadata via the local router 320 but also sending directly via a network gateway is possible, for example when the device is not in the computer network. The collected application network traffic metadata may comprise following data but is not limited to it: an application name, an identification of the application, a version of the application, a network traffic protocol type (e.g. Transmission Control Protocol (TCP), Hypertext Transfer Protocol (HTTP), Hypertext Transfer Protocol Secure (HTTPS), User Datagram Protocol (UDP), Domain Name System (DNS), Multicast DNS (MDNS)), a timestamp of a connection, a connection target, a connection direction, number of transferred bytes to upstream and/or downstream, and a computer device identification running the dedicated software application.

Each local router 320 of the plurality of local networks collects network traffic data from the local network. The local router 320 has access to same set of network traffic metadata as collected by the one or more computer devices 310 excluding device specific information such as an application name running on the one or more computer devices 310, an identification name and a software version of the application. The device specific information may comprise any information that is not visible on network level for the local router 320 but is pertinent for attributing the network traffic originating from a specific application.

Data feeds 301, 302 from the local routers 320 and the one or more computer devices are combined in the application detection service 322 by matching metadata attributes collected from both sources and labeling the data based on application information received from the one or more computer devices 310. In an embodiment, this automatic labeling enables collecting well labeled network traffic data from customer deployments (crowd sourcing) while at the same time limiting any negative impact on user experience by tightly controlling when the network traffic metadata collection is enabled on each device.

In an embodiment, the collected data is automatically labeled and classified based on metadata such as router geolocation and an application version, and by cleaning any outliers detected from the collected data. In an embodiment, a minimum number of routers and/or computer devices is determined for the data collection to enable building of an application detection model based on the data. This increases the reliability of the application detection model and, also makes it harder for malicious actors to attempt affecting the detection, for example, by using several devices with falsified applications behaving differently. In an embodiment, if seen necessary, further actions can be taken against computer devices and routers that are constantly detected to send deviating data from other populations by excluding those from the data collection. In an embodiment, each computer device that is used to collect the metadata may be selected based on different rules. For example, the computer device may be pinned to the router and only data sent by a computer device that is marked to be managed by the router is collected. Thus, a computer device may not send any data unless it is connected to its "home" router, for example. In some embodiments, the computer devices that are used for data collection may also be changed depending on geolocation, and/or date/time, for example.

The collected and processed data is used to create one or more machine learning models and/or rules to detect applications running on computer devices solely based on the network traffic that is seen by the router. Accurate application detection may be used to record and show application usage times, to enforce application and/or application category specific time limits and to block any malicious applications, for example.

By constantly updating and increasing the amount of well labeled network traffic data received from the one or more computer devices and the one or more routers, the application detection model can be frequently updated for a vast number of new applications and be used to increase accuracy of existing application detections as well.

Figure 4:
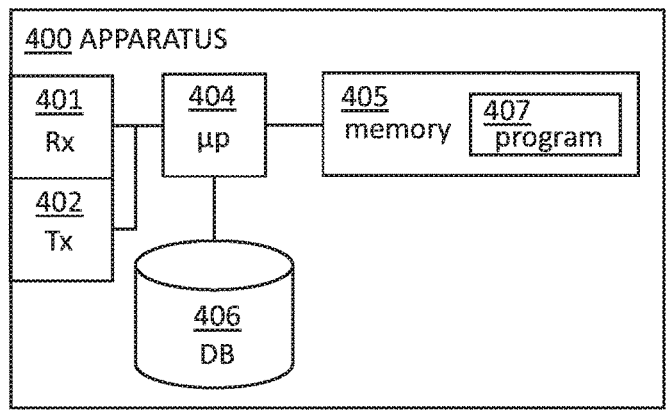
FIG. 4 is a block diagram of an apparatus, according to one embodiment.

Turning now to FIG. 4 that is showing an example of a network apparatus that can implement the method according to an embodiment.

A processor 404 is provided that is configured to receive, from one or more user devices on a plurality of local networks, first network traffic metadata collected by the one or more user devices and being related to one or more client applications running on the one or more user devices, the first network traffic metadata comprising an application name of the one or more client applications, a target Internet Protocol (IP) address requested by the one or more client applications, and a timestamp of a connection request initiated by the one or more client applications. The processor 404 is further configured to receive, from a plurality of network traffic hubs of the plurality of local networks, second network traffic metadata corresponding to the first network traffic metadata but excluding user device specific data related to the one or more user devices that is not visible on a network level and to generate a plurality of combined network traffic metadata datasets for each received first network traffic metadata and the corresponding second network traffic metadata by matching metadata attributes of the first network traffic metadata and the second network traffic metadata. The processor 404 is further configured to generate an application detection model by using the plurality of combined network traffic metadata datasets; and to use the application detection model for detecting further client applications running on one or more user devices on one or more local networks.

In an embodiment, the processor 404 is configured to store data such as any network-based identification data, metadata, attributes, values, addresses, hostnames as well as other data related to received metadata, state information and/or domain data to the database 406. The database 406 is shown in this example as being located at the apparatus 400, but it will be appreciated that the apparatus 400 may alternatively access a remote database. The database 406 may comprise necessary data collected from user devices and/or plurality of local networks.

The apparatus 400 is provided with a receiver 401 that receives the collected network traffic metadata. A transmitter 402 is also provided for communication with a computer network, a router, a computer device and/or an outside server.

In the above description, the apparatus 400 is described as having different transmitter and receiver. It will be appreciated that these may be disposed in any suitable manner, for example in a single transmitter and receiver, a transceiver and so on. Similarly, a single processor 404 is described but it will be appreciated that the function of the processor may be performed by a single physical processor or by more than one processor.

The apparatus 400 is also provided with a non-transitory computer readable medium in the form of a memory 405. The memory may be used to store a computer program 407 which, when executed by the processor 400, causes the processor 404 to perform the functions described above. The computer program 407 may be provided from an external source. In an embodiment, at least some or even all the functions of the method can be implemented in any apparatus, for example any computer device or a server.

Figure 5:
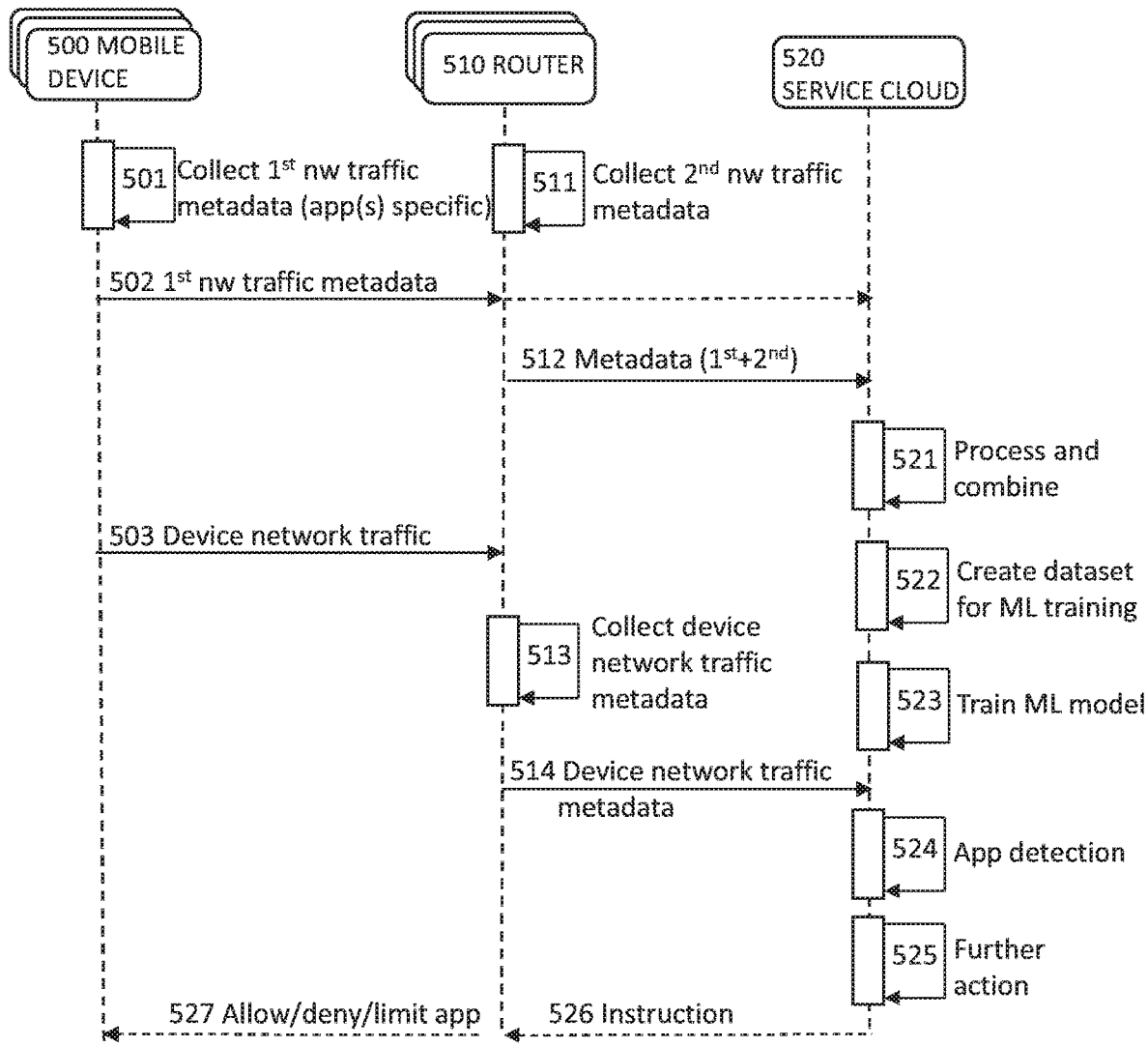
FIG. 5 is a signal sequence diagram illustrating a process, according to one embodiment.

FIG. 5 a signal sequence diagram illustrating a process according to an embodiment.

The steps, signaling messages and related functions described in relation to FIG. 5 are in no absolute chronological order, and some of the steps may be performed simultaneously or in a different order.

In 502, one or more mobile devices 500 of each computer network of a plurality of computer networks collects first network traffic metadata from one or more applications running on the mobile device(s) 500. The first network traffic metadata comprises application specific network usage metadata. In 502, the collected first network traffic metadata is sent to a service cloud 520, for example, via using Wi-Fi and home network router connection of each mobile device.

In 511, a plurality of router computer(s) 510 of the plurality of computer networks collect second network traffic metadata corresponding to the first network traffic metadata but excluding user device specific data related to the one or more user devices that is not visible on a network level. The second network traffic metadata comprises device network usage metadata.

In 512, both the first network traffic metadata and the second network traffic metadata are received by the service cloud 520. In 521, the received data is processed and combined by matching metadata attributes, labeling and/or using geolocation data of the router(s) and/or the one or more mobile devices. The raw combined network activity data created in 521 is used to create machine learning datasets suitable for machine learning training in 522 and in 523, and a machine learning model for application detection is trained by using the datasets created.

In 524, the trained machine learning model is used for detecting/identifying further client applications running on one or more user devices on one or more local networks based on further device network usage metadata received from one or more router computers in 514.

In 525, based on the detected/identified further client applications in 524, further action can be taken to protect one or more local networks and/or the one or more user devices based on the detected/identified client application. In 526 and 527, instructions for controlling or managing the detected/identified client application is sent. The further action may comprise one or more of: blocking the client application, enforcing time limits to client application or application categories, preventing communication with the client application, applying other security measures.

Figure 6:
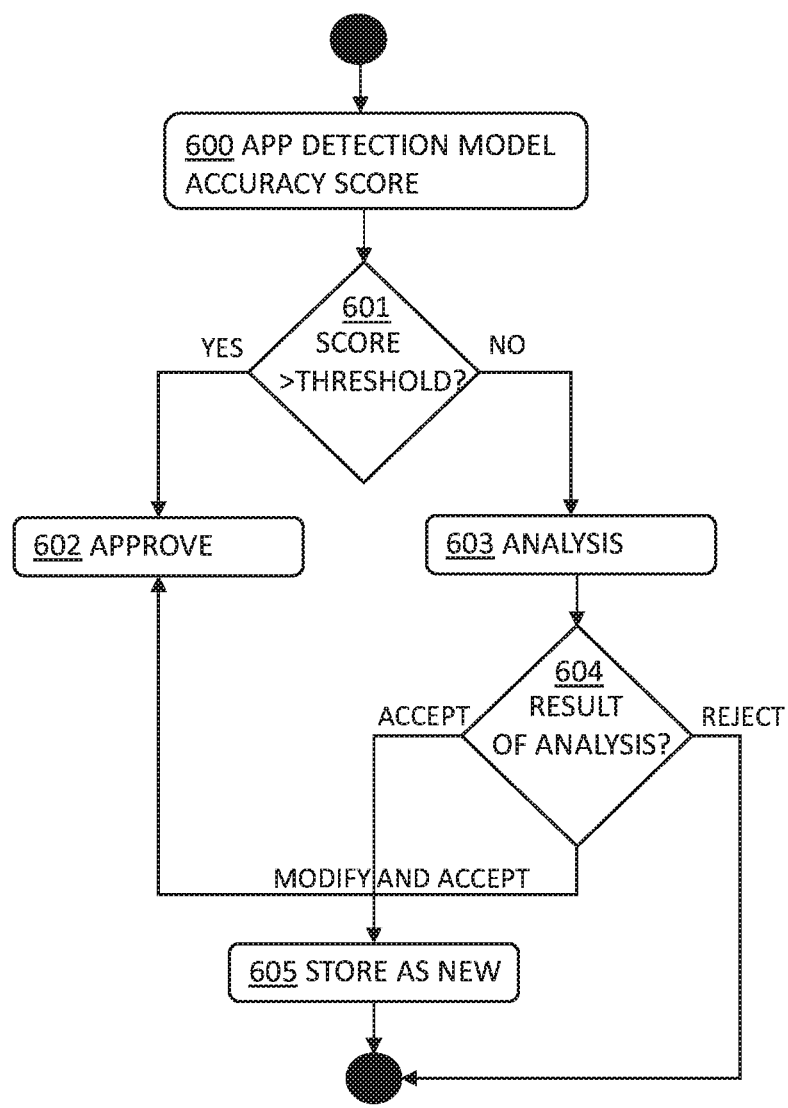
FIG. 6 illustrates an example process flow according to an embodiment.

FIG. 6 shows an example of an application detection model approval and accuracy modification scheme. In 600, an application detection model accuracy score is determined. In 601, it is determined whether the score exceeds a predetermined threshold, and if yes, then 602 is entered where the model is approved. In case in 601, the score is below the predetermined threshold, then 603 is entered where further analysis is performed on the data and/or more data is collected. The analysis can be made automatically or by a human analyst, for example. In 604, depending on the result of the analysis, the model/data may be accepted, rejected or accepted after modifications, for example. If the model is accepted after 604, then the generated model may be stored as newly created application detection description in 605.

The predetermined threshold for approving the application detection model may be based on, for example, the number of network traffic hubs/routers that are required to send a similar dataset and/or a percentage of datasets required to be similar. The system could be prone to user malicious feeding of application data and if too small dataset is relied on, then outliers may not be cleaned effectively enough. However, any malicious attempts to fool the system would require a high number of physical network traffic hubs/routers and would become expensive for a malicious actor. These kinds of attempts would also be identified by an operator of the network as an abnormal customer purchasing behavior, for example.

The steps, signaling messages and related functions described above in relation to the figures are in no absolute chronological order, and some of the steps may be performed simultaneously or in a different order. Other functions may also be executed between the steps and other signaling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers.

The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises a code for receiving first network traffic metadata collected by one or more user devices and being related to one or more client applications running on the one or more user devices. The computer program comprises also a code for receiving, from a plurality of network traffic hubs of the plurality of local networks, second network traffic metadata corresponding to the first network traffic metadata but excluding user device specific data related to the one or more user devices that is not visible on a network level and a code for generating a plurality of combined network traffic metadata datasets for each received first network traffic metadata and the corresponding second network traffic metadata by matching metadata attributes of the first network traffic metadata and the second network traffic metadata. The computer program further comprises a code for generating an application detection model by using the plurality of combined network traffic metadata datasets; and a code for using the application detection model for detecting further client applications running on one or more user devices on one or more local networks.

Although the invention has been described in terms of preferred embodiments as set forth above, these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
receiving, from one or more user devices on a plurality of local networks, first network traffic metadata collected by the one or more user devices and being related to one or more client applications running on the one or more user devices, the first network traffic metadata comprising an application name of the one or more client applications, a target Internet Protocol (IP) address requested by the one or more client applications, and a timestamp of a connection request initiated by the one or more client applications;
receiving, from a plurality of network traffic hubs of the plurality of local networks, second network traffic metadata corresponding to the first network traffic metadata but excluding user device specific data related to the one or more user devices that is not visible on a network level for the plurality of network traffic hubs, the user device specific data related to the one or more user devices that is not visible on the network level for the plurality of network traffic hubs comprising one or more of a client application identity, an application name of the one or more client applications running on the one or more user devices, an identification name and a software version of the client application;
generating a plurality of combined network traffic metadata datasets for each received first network traffic metadata and the corresponding second network traffic metadata by matching metadata attributes of the first network traffic metadata and the second network traffic metadata;
generating an application detection model by using the plurality of combined network traffic metadata datasets; and
using the application detection model for detecting further client applications running on one or more user devices on one or more local networks.

2. The method according to claim 1, wherein the first network traffic metadata is collected by the one or more user devices and the second network traffic metadata is collected by the plurality of network traffic hubs.

3. The method according to claim 2, the method further comprising creating one or more rules for instructing the one or more user devices and/or one or more network traffic hubs of when to collect the first network traffic metadata and the second network traffic metadata, wherein the one or more rules are created based on at least one of: an identity of a local network of the plurality of local networks, running detection only on a limited number of user devices, enabling detection only for new client applications of the one or more client applications, and enabling detection only for updated client applications of the one or more client applications.

4. The method according to claim 1, wherein a specific client application detection software is deployed in the one or more user devices for collecting the first network traffic metadata.

5. The method according to claim 1, further comprising labelling the plurality of combined network traffic metadata datasets by using the first network traffic metadata.

6. The method according to claim 1, further comprising clustering the plurality of combined network traffic metadata datasets based on one or more of: a type of the client application, a version of the client application, a geolocation of the one or more user devices on the plurality of local networks, and a geolocation of the plurality of network traffic hubs of the plurality of local networks.

7. The method according to claim 6, further comprising detecting outlier datasets in the plurality of combined network traffic metadata datasets and removing the outlier datasets from the plurality of combined network traffic metadata datasets.

8. The method according to claim 1, further comprising:
determining a required dataset size of the plurality of combined network traffic metadata datasets based on one or more threshold values of: a number of network traffic hubs required to receive a similar dataset, and a percentage of datasets required to be similar; and
adjusting the application detection model accuracy dynamically based on the required dataset size of the plurality of combined network traffic metadata datasets.

9. The method according to claim 8, further comprising assigning an application detection model accuracy score based on the required dataset size, wherein the application detection model accuracy score is determined by using one or more of: decision rules, statistical analysis, and artificial intelligence techniques.

10. The method according to claim 9, further comprising:
in response to determining that the application detection model accuracy score is above a predetermined threshold, accepting the application detection model; and
in response to determining that the application detection model accuracy score is below the predetermined threshold, modifying the application detection model by increasing the required dataset size.

11. The method according to claim 1, wherein the first network traffic metadata further comprises one or more of: a client application identity, a version of the one or more client applications, a network traffic type, a connection target, a connection direction, number of bytes transferred upstream and downstream, a user device identification, and a protocol type.

12. The method according to claim 1, further comprising receiving further data related to the plurality of network traffic hubs, from the plurality of network traffic hubs, for each network traffic hub, the further data comprising one or more of: a hardware version, a software version, an operating system version, and an IP address of the network traffic hub of the plurality of network traffic hubs.

13. The method according to claim 1, further comprising taking further action to protect one or more local networks and/or the one or more user devices based on the detected client application, the further action comprising one or more of: blocking the client application, enforcing time limits to client application or application categories, preventing communication with the client application, and applying other security measures.

14. An apparatus in a computer network system comprising:
one or more processors; and
a non-transitory computer-readable medium comprising stored program code, the program code comprising computer-executable instructions that, when executed by the one or more processors, cause the one or more processors to:
receive, from one or more user devices on a plurality of local networks, first network traffic metadata collected by the one or more user devices and being related to one or more client applications running on the one or more user devices, the first network traffic metadata comprising an application name of the one or more client applications, a target Internet Protocol (IP) address requested by the one or more client applications, and a timestamp of a connection request initiated by the one or more client applications;
receive, from a plurality of network traffic hubs of the plurality of local networks, second network traffic metadata corresponding to the first network traffic metadata but excluding user device specific data related to the one or more user devices that is not visible on a network level for the plurality of network traffic hubs, the user device specific data related to the one or more user devices that is not visible on the network level for the plurality of network traffic hubs comprising one or more of a client application identity, an application name of the one or more client applications running on the one or more user devices, an identification name and a software version of the client application;
generate a plurality of combined network traffic metadata datasets for each received first network traffic metadata and the corresponding second network traffic metadata by matching metadata attributes of the first network traffic metadata and the second network traffic metadata;
generate an application detection model by using the plurality of combined network traffic metadata datasets; and
use the application detection model for detecting further client applications running on one or more user devices on one or more local networks.

15. The apparatus according to claim 14, wherein a specific client application detection software is deployed in the one or more user devices for collecting the first network traffic metadata.

16. The apparatus according to claim 14, wherein the instructions further cause the one or more processors to: label the plurality of combined network traffic metadata datasets by using the first network traffic metadata.

17. The apparatus according to claim 14, wherein the instructions further cause the one or more processors to cluster the plurality of combined network traffic metadata datasets based on one or more of: a type of the client application, a version of the client application, a geolocation of the one or more user devices on the plurality of local networks, and a geolocation of the plurality of network traffic hubs of the plurality of local networks.

18. The apparatus according to claim 17, wherein the instructions further cause the one or more processors to: detect outlier datasets in the plurality of combined network traffic metadata datasets and remove the outlier datasets from the plurality of combined network traffic metadata datasets.

19. The apparatus according to claim 14, wherein the instructions further cause the one or more processors to:
determine a required dataset size of the plurality of combined network traffic metadata datasets based on one or more threshold values of: a number of network traffic hubs required to receive a similar dataset, and a percentage of datasets required to be similar; and
adjust the application detection model accuracy dynamically based on the required dataset size of the plurality of combined network traffic metadata datasets.

20. A non-transitory computer-readable medium comprising stored program code, the program code comprising computer-executable instructions that, when executed by a processor, cause the processor to:
receive, from one or more user devices on a plurality of local networks, first network traffic metadata collected by the one or more user devices and being related to one or more client applications running on the one or more user devices, the first network traffic metadata comprising an application name of the one or more client applications, a target Internet Protocol (IP) address requested by the one or more client applications, and a timestamp of a connection request initiated by the one or more client applications;
receive, from a plurality of network traffic hubs of the plurality of local networks, second network traffic metadata corresponding to the first network traffic metadata but excluding user device specific data related to the one or more user devices that is not visible on a network level for the plurality of network traffic hubs, the user device specific data related to the one or more user devices that is not visible on the network level for the plurality of network traffic hubs comprising one or more of a client application identity, an application name of the one or more client applications running on the one or more user devices, an identification name and a software version of the client application;

generate a plurality of combined network traffic metadata datasets for each received first network traffic metadata and the corresponding second network traffic metadata by matching metadata attributes of the first network traffic metadata and the second network traffic metadata;

generate an application detection model by using the plurality of combined network traffic metadata datasets; and use the application detection model for detecting further client applications running on one or more user devices on one or more local networks.

\* \* \* \* \*